United States Patent
Foo

(10) Patent No.: US 10,402,935 B2
(45) Date of Patent: Sep. 3, 2019

(54) PERFORMANCE PROFILING IN COMPUTER GRAPHICS

(71) Applicant: Imagination Technologies Limited, Kings Langley (GB)

(72) Inventor: Yoong-Chert Foo, London (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 15/798,662

(22) Filed: Oct. 31, 2017

(65) Prior Publication Data

US 2018/0158168 A1    Jun. 7, 2018

(30) Foreign Application Priority Data

Oct. 31, 2016 (GB) .................................. 1618358.4

(51) Int. Cl.
  *G06T 1/20* (2006.01)
  *G06T 15/00* (2011.01)
  *G06F 11/34* (2006.01)

(52) U.S. Cl.
  CPC ............... *G06T 1/20* (2013.01); *G06F 11/34* (2013.01); *G06F 11/3419* (2013.01); *G06F 11/3476* (2013.01); *G06T 15/005* (2013.01); *G06F 11/348* (2013.01); *G06F 2201/86* (2013.01); *G06F 2201/88* (2013.01)

(58) Field of Classification Search
  CPC ................................ G06T 1/20; G06T 15/005
  USPC ........................................ 345/501, 503, 506
  See application file for complete search history.

(56) References Cited

U.S. PATENT DOCUMENTS

| | | | |
|---|---|---|---|
| 7,519,797 B1 * | 4/2009 | Stiehl ................... | G06F 9/3867 712/225 |
| 8,963,932 B1 | 2/2015 | Kiel et al. | |
| 9,342,430 B2 | 5/2016 | Diesi | |
| 2007/0139421 A1 * | 6/2007 | Chen ........................ | G06T 1/20 345/501 |

(Continued)

FOREIGN PATENT DOCUMENTS

WO    2010141612 A1    12/2010

OTHER PUBLICATIONS

Whitney; "Tools and Techniques for GPU Performance Profiling"; Internet Citation; URL:http://developer.amd.com/documentation/articles/pages/9242007176.aspx; Sep. 24, 2007; pp. 1-5.

*Primary Examiner* — Jacinta M Crawford
(74) *Attorney, Agent, or Firm* — Vorys, Sater, Seymour and Pease LLP; Vincent M DeLuca

(57) ABSTRACT

A method of profiling the performance of a graphics unit when rendering a scene according to a graphics pipeline, includes executing stages of the graphics pipeline using one or more units of rendering circuitry to perform at least one rendering task that defines a portion of the work required to render the scene, the at least one rendering task associated with a set flag; propagating an indication of the flag through stages of the graphics pipeline as the scene is rendered so that work done as part of the at least one rendering task is associated with the set flag; changing the value of a counter associated with a unit of rendering circuitry in response to an occurrence of an event while that unit performs an item of work associated with the set flag; and reading the value of the counter to thereby measure the occurrences of the event caused by completing the at least one rendering task.

20 Claims, 8 Drawing Sheets

(56) References Cited

U.S. PATENT DOCUMENTS

| | | |
|---|---|---|
| 2008/0100627 A1* | 5/2008 | Nystad .................. G06T 15/005 345/502 |
| 2009/0164812 A1* | 6/2009 | Capps, Jr. ............. G06F 1/3203 713/320 |
| 2010/0020090 A1* | 1/2010 | Langtind ................. G06T 11/40 345/581 |
| 2011/0018884 A1 | 1/2011 | Ritts et al. |
| 2011/0154238 A1 | 6/2011 | Cormack et al. |
| 2011/0154337 A1 | 6/2011 | Cormack et al. |
| 2011/0320779 A1* | 12/2011 | Ambroladze ....... G06F 11/3419 712/220 |
| 2012/0236011 A1 | 9/2012 | Diesi |
| 2014/0118369 A1* | 5/2014 | Hakura ..................... G06F 9/44 345/522 |
| 2014/0118370 A1 | 5/2014 | Hakura et al. |
| 2014/0168231 A1* | 6/2014 | Allen ....................... G06T 1/20 345/506 |

\* cited by examiner

PERFORMANCE PROFILING IN COMPUTER GRAPHICS

This invention relates to performance profiling in a computer graphics unit.

BACKGROUND

Hardware and/or software developers frequently want to monitor, or profile, the performance of a computer system when performing certain processing tasks in order to optimise the operation or design of certain software or hardware components. One field where performance profiling is particularly useful is in graphics processing. Graphics processing concerns the rendering of two-dimensional images for display on a screen from a (typically) three-dimensional model of a scene. The image of the scene can be rendered by performing a series of processing steps referred to as a graphics pipeline.

Application developers may wish to profile the performance of the graphics system when rendering a scene according to the graphics pipeline. Sometimes, it may be sufficient to know only relatively coarse performance information, e.g. the total length of time required to render a scene. However, it is often desirable to obtain a finer granularity of performance information so that bottlenecks in the system's performance can be more readily identified. For example, it may be desirable to obtain performance information related to only part of a scene being rendered, so that the developer can optimise the relevant part of the scene so as to improve the graphics system's performance during rendering.

For certain graphics architectures, it may be relatively simple to obtain finer resolution performance information. One such architecture is pure immediate mode rendering (IMR). In immediate mode rendering, each submitted graphical object of the scene travels through the entire graphics pipeline and is processed in its entirety, ahead of the next graphical object that is submitted to the pipeline. Thus the graphical objects stay in order, i.e. the completion order for the objects is the same as the order in which the objects were submitted to the pipeline. Information on the performance of the graphics system when rendering a particular graphical object can therefore be obtained by beginning the measurement of the particular performance parameter when drawing of the object begins (e.g. when the graphical object is submitted to the beginning of the graphics pipeline) and stopping the measurement when the drawing ends (e.g. once the pixel data for the object has been generated).

However, for other graphics architectures, obtaining the performance data may be less straightforward. One class of such architectures are tile-based renderers. In tile based renderers, an image to be rendered is sub-divided into screen-space tiles, with rasterization then being performed on a per-tile basis instead of rasterizing the entire image as an immediate mode renderer would. Tile-based renderers typically exploit a high level of parallelism. In addition, it is not unusual for objects of the scene to be rendered to span across multiple tiles. For example, an object of the scene (e.g. a person) may span multiple tiles, where the person occupies a relatively large proportion of certain tiles and a relatively little proportion of other tiles. The rendering of two tiles containing parts of the same object may be separated in time. Because of this, it may be difficult to obtain fine granularity performance information for tile-based renderers.

SUMMARY

According to one aspect of the present disclosure there is provided method of profiling the performance of a graphics unit when rendering a scene according to a graphics pipeline, the method comprising: executing stages of the graphics pipeline using one or more units of rendering circuitry to perform at least one rendering task that defines a portion of the work required to render the scene, the at least one rendering task associated with a set flag; propagating an indication of the flag through stages of the graphics pipeline as the scene is rendered so that work done as part of the at least one rendering task is associated with the set flag; changing the value of a counter associated with a unit of rendering circuitry in response to an occurrence of an event whilst that unit performs an item of work associated with the set flag; and reading the value of the counter to thereby measure the occurrences of the event caused by completing the at least one rendering task.

The at least one rendering task may comprise a draw call to draw a portion of a scene The at least one rendering task may comprise a draw call to draw one or more objects of the scene.

The method may further comprise enabling the counter in response to the associated unit performing an item of work associated with the flag, and disabling the counter when the associated unit performs an item of work not associated with the flag.

The flag may be propagated through each stage of the graphics pipeline.

The method may further comprise associating, at a tagging unit, the set flag with the at least one rendering task.

The graphics pipeline may be a tile-based rendering pipeline.

The set flag may be associated with the at least one rendering task prior to the tiling stage of the pipeline so that at least a portion of the work to complete the at least one rendering task occurs prior to the tiling stage of the pipeline.

The graphics pipeline may comprise a geometry processing stage and a fragment processing stage, and an indication of the flag may be propagated from the geometry processing stage to the fragment processing stage.

The method may comprise storing an indication of the flag as part of intermediate parameter data generated from the geometry processing stage performed as part of the at least one rendering task to be used by the fragment processing stage.

The method may further comprise: performing the geometry processing stage to generate primitive data from geometry data of the scene; and associating an indication of the flag with all of the primitive data generated as part of the at least one rendering task.

The method may further comprise propagating the flag from the geometry processing stage to the fragment processing stage by associating an indication of the flag with fragments generated from primitive data associated with an indication of the flag.

The flag may be set by a driver that submits geometry data for the scene to be processed by the graphics pipeline.

The method may further comprise changing the value of a plurality of counters associated with a plurality of units of the rendering circuitry in response to occurrences of events whilst those units perform items of work associated with the flag.

The plurality of counters may count respective events associated with different stages of the graphics pipeline.

The method may further comprise reading the values of each of the counters to measure the occurrences of the events caused by completing the at least one rendering task.

Each counter may be associated with a different stage of the graphics pipeline.

At least one of the units of rendering circuitry may be associated with a plurality of counters, each of the plurality of counters counting an event associated with a different stage of the graphics pipeline.

The event could be one of: a clock cycle, a generation of a primitive; the culling of a primitive; the generation of a vertex; the processing of a vertex; and invocation of: a vertex shader; hull shader; domain shader; geometry shader; clipper; pixel shader or compute shader; the depth testing of a pixel as part of hidden surface removal; the decoding of an instruction or a texture request.

According to a second aspect of the present disclosure there is provided a graphics unit configured to render a scene according to a graphics pipeline, the graphics unit comprising: at least one unit of rendering circuitry configured to execute stages of the graphics pipeline to perform at least one rendering task that defines a portion of the work to render the scene, the at least one rendering task associated with a set flag; the graphics unit being configured to propagate an indication of the flag through stages of the graphics pipeline as the scene is rendered so that work done as part of the at least one rendering task is associated with the set flag; a counter associated with a unit of rendering circuitry configured to change in value in response to an occurrence of an event whilst that unit performs an item of work associated with the set flag; and a counter reader configured to read the value of the counter to thereby measure the occurrences of the event caused by completing the at least one rendering task; and output a value indicative of the measured occurrences of the event.

The counter may be configured to be enabled in response to the associated unit performing an item of work associated with the flag, and disabled when the associated unit of rendering circuitry performs an item of work not associated with the flag.

The graphics unit may be configured to propagate the flag through each stage of the pipeline.

The graphics pipeline may be a tile-based rendering pipeline

The pipeline may comprise a geometry processing stage and a fragment processing stage, and the graphics unit may be configured to propagate an indication of the flag from the geometry processing stage to the fragment processing stage.

The graphics unit may comprise a plurality of counters associated with a plurality of units of the rendering circuitry, each of the plurality of counters being configured to change in value in response to an occurrence of a respective event whilst those units perform items of work associated with the flag.

The plurality of counters may be configured to count respective events associated with different stages of the graphics pipeline.

The counter reader may be configured to read the values of each of the counters to measure the occurrences of the events caused by completing the at least one rendering task.

At least one of the units of rendering circuitry may be associated with a plurality of counters, each of the plurality of counters counting an event associated with a different stage of the graphics pipeline.

The graphics unit may further comprise a tagging unit configured to associate the set flag with the at least one rendering task.

The tagging unit may be configured to associate the set flag with the at least one rendering task prior to the tiling stage of the pipeline so that at least a portion of the work to complete the at least one rendering task occurs prior to the tiling stage of the pipeline.

According to another aspect of the present disclosure there is provided a computing apparatus comprising a graphics unit in accordance with any of the examples described herein, and a tagging unit.

The computing apparatus may further comprise a parameter buffer configured to store intermediate parameter data generated from the geometry processing stage to be used by the fragment processing stage, and the graphics unit may be configured to store an indication of the set flag in the parameter buffer as part of the intermediate data generated from the geometry processing performed as part of the at least one rendering task.

The graphics unit may be configured to store the indication of the set flag in the parameter buffer as part of primitive data generated as part of the at least one rendering task.

The graphics unit may be configured to propagate an indication of the flag from the geometry processing stage to the fragment processing stage by associating an indication of the flag with fragments generated from primitive data that has an associated indication of the flag.

The tagging unit may form part of a graphics driver configured to submit geometry data for the scene to be processed by the graphics pipeline.

The computing apparatus and/or graphics unit may be embodied in hardware on an integrated circuit. There may be provided a method of manufacturing, at an integrated circuit manufacturing system, the computing apparatus and or graphics unit. There may be provided an integrated circuit definition dataset that, when processed in an integrated circuit manufacturing system, configures the system to manufacture the computing apparatus and or graphics unit. There may be provided a non-transitory computer readable storage medium having stored thereon a computer readable description of an integrated circuit that, when processed in an integrated circuit manufacturing system, causes the integrated circuit manufacturing system to manufacture the computing apparatus and or graphics unit.

There may be provided an integrated circuit manufacturing system comprising: a non-transitory computer readable storage medium having stored thereon a computer readable integrated circuit description that describes the computing apparatus or graphics unit; a layout processing system configured to process the integrated circuit description so as to generate a circuit layout description of an integrated circuit embodying the computing apparatus or graphics unit; and an integrated circuit generation system configured to manufacture the computing apparatus or graphics unit according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

BRIEF DESCRIPTION OF DRAWINGS

The present invention will now be described by way of example with reference to the accompanying drawings. In the drawings.

DETAILED DESCRIPTION

Figure 1:
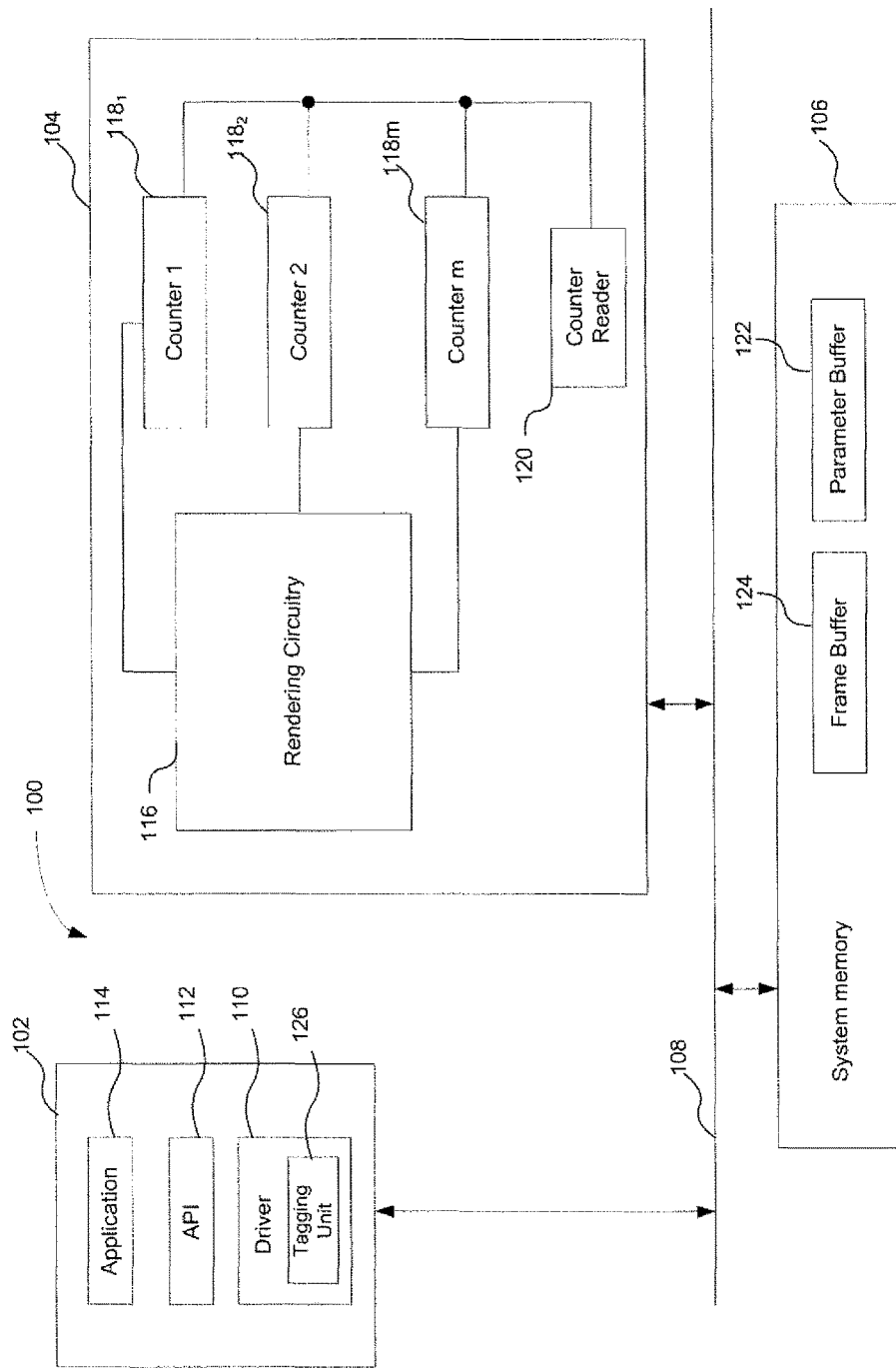
FIG. 1 shows a computer system with a graphics unit that can be profiled when rendering a scene.

The present disclosure is directed to profiling the performance of a graphics unit (e.g. a GPU) when rendering a scene according to a graphics pipeline. The graphics pipeline may be split into two phases: a geometry processing phase and a rasterization, or fragment processing, phase. The geometry processing phase is concerned with transforming geometry data from model coordinates to screen-space coordinates and typically involves per-vertex or per-primitive operations. The rasterization phase involves per-pixel, or per-fragment, operations and is concerned with computing pixel colours for each pixel of the displayed image. To profile the performance of the graphics unit, a portion of the work that is required to render the scene is tagged, or identified. This may be done by associating a set flag (or an 'enabled' flag) with at least one rendering task that defines, or forms, that portion of the work required to render a scene. That rendering task could for example be a draw call to render a geometric object, or item forming part of that scene. It could be a draw call to render a group of such objects or items. The rendering task(s) that are tagged may not directly result in a visible part of the scene being rendered. That is, the rendering task may not relate to a portion of the scene that is to be rendered, but nevertheless defines work that needs to be done in order to render the scene. Tagging the at least one rendering task means that as the work stemming from performing that task flows, or propagates through the graphics pipeline, counters can be used to measure the performance of the graphics unit in performing the work that is tagged, or identified. By only tagging work related to the rendering task(s) of interest and not other tasks performed when rendering the scene, the counters can be used to accurately measure the performance of the graphics system in completing that rendering task. Thus, selectable subsets of the work required to render a scene can be profiled.

It is noted that, as used herein, a 'set' or 'enabled' flag may be any flag or field set to a value that indicates that a task is part of the tagged portion of work, and which allows it to be distinguished from tasks that are not part of the tagged portion of work. Thus, the value used to represent a set or enabled flag is unimportant. If the flags were 1-bit flags, for example, then a value of '1' or '0' could equally be used for a set or enabled flag.

In some examples, the rendering task may be a task to render a portion of a scene. Work done in relation to processing the scene portion through the pipeline can be tagged by associating a set flag with one or more draw calls for that scene portion. In this way, the flag, or an indication of the flag, can be propagated through the graphics pipeline so that each item of work forming part of the graphics pipeline to render the scene portion is associated with the set flag. In other words, each task forming part of the workload to render the scene portion can be identified. A task could for example be an instruction fetch, a texture fetch, a processing task such as a vertex or pixel processing task etc. One or more counters can be implemented at various stages of the graphics and/or hardware pipeline to measure the occurrences of an event caused by rendering the scene portion. The event being monitored by a counter is associated with a particular stage of the graphics pipeline (and in particular the item of work performed as part of that stage of the pipeline), and could be, for example, the generation of a primitive; generation of a vertex; invocation of a shader; a pixel depth test; a texture cache hit and/or miss etc. The counters are configured to change in value (e.g. increment or decrement) only when an event occurs whilst performing an item of work associated with the set flag (i.e. tasks and/or sub-tasks forming part of the flagged rendering tasks). When an event occurs whilst performing an item of work not associated with a set flag (e.g. tasks relating to another portion of the scene or other non-flagged rendering tasks), the counter does not change in value. Thus a set flag may enable the counter, with the counter being disabled at other times.

FIG. 1 shows the architecture of an example computing system or apparatus 100 that can profile the performance of a graphics unit when rendering a scene.

The apparatus comprises a central processing unit (CPU) 102; a graphics unit 104 and a system memory 106 coupled together by a system bus 108.

The CPU 102 includes a graphics driver 110, and application-program interface (API) 112. The CPU 102 may execute one or more graphics applications 114 to cause images to be generated by the graphics unit 104. Execution of the graphics application 114 invokes application instructions. These instructions may be generated from API calls, or commands, from the API 112. The API calls may be translated into commands by the driver 110, which are communicated to the graphics unit 104 via the system bus 108. Though shown here as being run on the CPU 102, the graphics driver may alternatively be run wholly or partially on the graphics unit 104, or be stored in the system memory 106.

The graphics unit 104 operates to render an image of a scene for display. To do this, the graphics unit may perform, or execute, the commands issued by the driver 110 to render graphics data into an image for display. The graphics unit could for example be a GPU, and may render graphics data in accordance with a graphics pipeline. That graphics pipeline could be a tile-based pipeline, such as a tile-based deferred rendering (TBDR) pipeline.

The graphics unit is shown comprising rendering circuitry 116, a plurality of counters $118_1$, $118_2$, $118_m$, and a counter reader 120 configured to read the values of the counters. Each counter may be an n-bit counter (i.e., capable of incrementing to a value of $2^n-1$). The counters may be capable of incrementing to different values. In general, each of a set of m counters may be an $n_m$-bit counter capable of incrementing to a value of $2^{n_m}-1$. The rendering circuitry is configured to execute tasks to perform the stages of the graphics pipeline. Those tasks may originate from the command issued by the driver 110. That is, the tasks may be created as the processing of the geometric object propagates along the pipeline. The term 'tasks' as it relates to the rendering circuitry described herein refers generally to one or more items, or units, of work. The tasks could be hierarchical; that is, a task may spawn or generate one or more sub-tasks. Similarly, a task may form part of a higher level task. Thus, the term 'task' could refer to a high level item of work (e.g., a processing job), or a low level item of work (e.g. a processing task executed within a shader engine, such as a vertex or pixel processing task).

Though the counters 118 and the counter reader 120 are shown in FIG. 1 as forming part of the graphics unit 104, it will be appreciated that this is merely an example and the counters and/or counter reader may alternatively be coupled to, but not form part of, the graphics unit 104.

Figure 2:
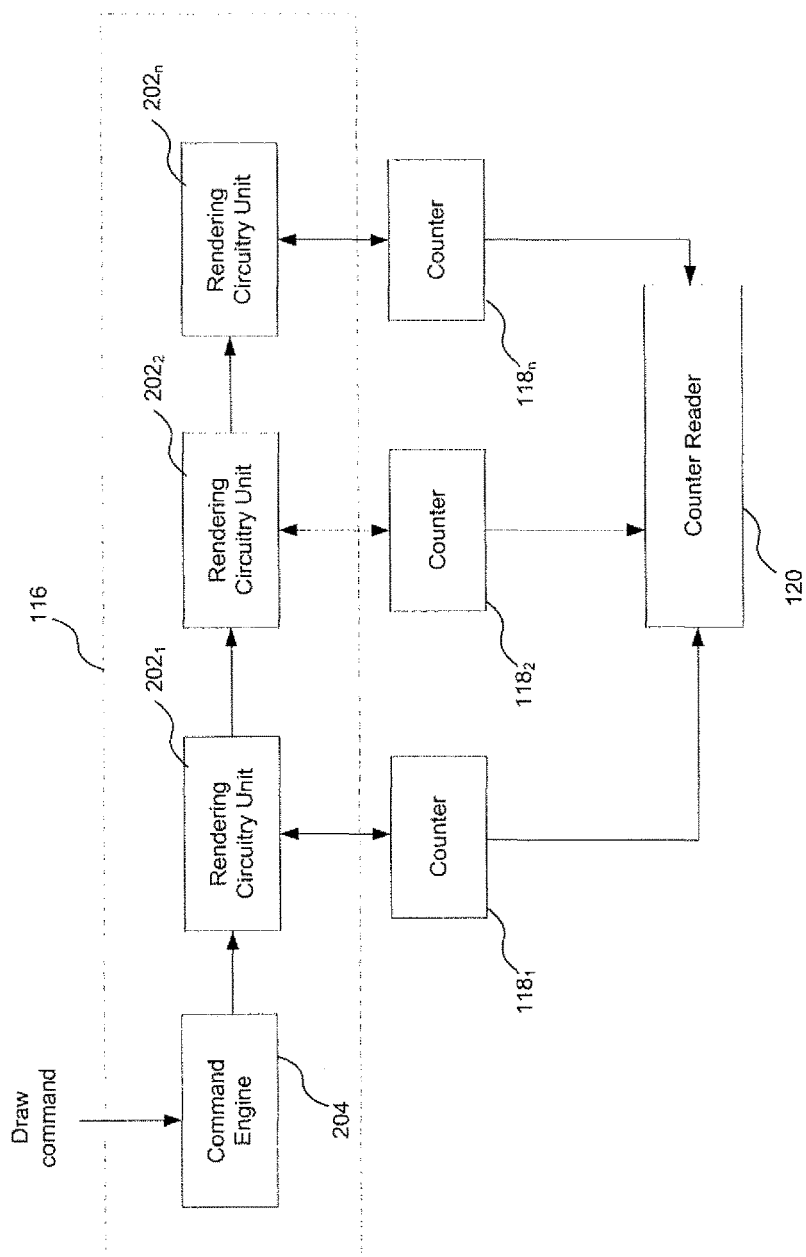
FIG. 2 shows the rendering circuitry forming part of the graphics unit in more detail.

The rendering circuitry is shown in more detail in FIG. 2. The rendering circuitry is shown as comprising a plurality of units $202_1$, $202_2$ and $202_3$, and a command engine 204. Each of the units is shown coupled to a respective counter $118_{1,2,3}$, but in other examples, a plurality of counters may be associated with a single unit of rendering circuitry and/or some units may not be associated with a counter. This will be explained in more detail below.

The command engine 204 is configured to receive commands issued from the driver 110. The command engine may fetch, decode and process commands from the driver 110. These commands could for example be draw commands also referred to herein as draw calls. A draw command is a command specifying that certain components of the scene (e.g. a portion of the scene) are to be rendered. A draw command may specify that one or more geometric items of the scene are to be rendered. A draw command may be associated with a set of data for use by the graphics unit in executing that command. That data may be stored in the system memory 106. The data may be stored in a series of data blocks in the system memory. This set of data may be referred to as a control stream. The control stream may contain data such as state data, vertices, shader parameters and instruction code. A particular rendering task (such as rendering a scene, or rendering geometric items specified by a draw command) may be associated with a set of control streams.

The command engine transmits commands and data to the units 202 for execution. The command engine may be the head, or beginning, of the geometry processing pipeline (and hence the graphics pipeline).

The rendering circuitry units 202 are configured to perform items of work (also referred to as tasks) on data as it is passed through stages of the graphics pipeline. A task could for example be a processing task (such as a vertex or fragment processing task) to process data (such as vertex or fragment data). Alternatively, a task could be an instruction fetch; an instruction decode or a data fetch (e.g. texture request). In general, a task is a processing step performed as part of the graphics pipeline to render the scene. The task may define one or more items of work to be performed.

The units 202 may be hardware units. Each unit may be associated with a single stage of the pipeline. Alternatively, one or more of the units may be associated with multiple stages of the pipeline. For example, one or more of the units could be a general purpose execution engine, such as a multi-threaded processor, configured to perform vertex and fragment processing tasks. Such an engine may comprise a plurality of arithmetic logic units (ALUs) configured to execute tasks in parallel. In general, the units may be configured to perform stages of the pipeline including: clipping, projecting, culling, tiling, hidden surface removal, texture fetching and fragment shading. In one example, the rendering units may be grouped into four modules: a tile accelerator; a unified shading engine; an image synthesis processor (ISP) and a texture and shading processor (TSP). Though shown in FIG. 2 in a pipelined arrangement, it will be appreciated that this is merely for the purposes of illustration. Though the units execute tasks to collectively implement the graphics pipeline, the processing units themselves may not be in a physical pipelined arrangement.

The operation of the computing system 100 when profiling the performance of the graphics unit 118 will now be described. In this example, the graphics unit 104 is executing commands from the graphics driver 110 invoked by application 114 to render an image of a scene for display. It is desired to measure the performance of the graphics unit when performing one or more rendering tasks that define at least a portion, or subset, of the work required to render the scene.

The rendering task(s) could be tasks specified by the application being executed. The rendering tasks could be specified at a level of granularity that is independent of the hardware of the graphics system (e.g. independent of the graphics pipeline). As described above, the rendering task(s) need not relate directly to the rendering of a visible component of the scene. However, they are tasks that are nevertheless required to be performed in order for the scene to be rendered. The rendering task(s) could for example be a draw call. That draw call could be a call to clear, or wipe, a previously rendered image. Alternatively, the draw call could be a call to draw an object; multiple objects; or portion, of the scene to be rendered.

For the purpose of illustration only, In the following example the rendering task is a draw call to draw a portion of a scene. In particular, the draw call is for a particular object, or item, of the scene (denoted item A for clarity). The scene is formed from a plurality of geometric objects defined by geometry data. In general, a geometric object, or item, may be a component item or feature of the scene. A geometric object may be formed from a plurality of primitives. The objects, or features of the scene may be defined by a geometry list for the scene. The scene of which an image is to be rendered is therefore composed of multiple geometric items that will also be rendered (along with item A) when the scene is rendered.

The work, or processing steps, performed by the graphics unit to render the scene may be referred to as the graphics workload. In order to profile aspects of the workload associated with rendering geometric item A, a set flag is associated with the rendering task to render item A. The set flag enables the rendering units 202 to identify when they are performing an item of work forming part of the workload for rendering geometric item A. As used herein, a rendering task associated with a set flag may equivalently be referred to as a flagged rendering task. This nomenclature also applies to data, tasks and/or items of work associated with a set flag that are described below.

The set flag is associated with the rendering task by tagging unit 126. In the example shown in FIG. 1, the tagging unit forms part of the driver 110. This is convenient because it can enable a user of the system 100 to specify the rendering task they wish to profile through the API 112. The user may, for example, specify through the API 112 which geometric item of the scene they wish to profile work for. In response to the user specifying a rendering task they wish to profile, the driver 110 can associate a set flag with that rendering task. However, the tagging unit 126 need not form part of the driver 110; it could for example be a standalone unit, implemented in either the CPU or graphics unit 104.

The set flag may be associated with a command received by the command engine 204 for rendering the scene of which item A forms a part. For example, the flag may form part of the draw call received by the command engine for geometric item A, or otherwise be associated with it. That is, the flag may be associated with a draw call indicating that geometric item A is to be rendered. In other examples, if the draw call specifies a set of geometric items are to be rendered, the flag may be associated with each of those items in the set. Alternatively, the flag may identify a selected subset of the geometric items of the set specified in the draw call (e.g. the flag may identify a selected one of the geometric items forming the set of geometric items specified by the draw call).

The flag may be stored in system memory 106 along with other control data associated with the draw call. It could for example form part of the control stream associated with the draw call. In this way, the command engine 204, in response to receiving the draw call, can access the control data associated with that call in system memory 206 and determine that that draw call is associated with a set flag.

The flag could take the form of a single bit, where the value of the bit determines whether the flag is set or not. For example, if the bit has a value of '0', this may indicate that no flag is set for a particular draw call, whereas a bit value of '1' may indicate that a flag is set for the draw call.

In response to receiving a draw call specifying that item A is to be rendered, the command engine 204 issues one or more commands to the rendering units 202 to cause those units to execute one or more tasks to execute stages of the graphics pipeline. The rendering units 202 execute stages of the graphics pipeline to perform the rendering task of rendering item A.

The rendering circuitry 116 is configured so that the set flag associated with the task of rendering item A is propagated through the stages of the graphics pipeline as the item is rendered so that work tasks executed by the processing units 202 to render item A are also associated with the set flag. That is, the work tasks executed by the processing units 202 forming part of the graphics workload to render item A are associated with, and thus identified by, the set flag. In addition, data generated by the pipeline as the rendering task to render item A is performed may also be associated with the set flag. This allows the work performed to render item A to be readily monitored and profiled, as will be described below.

To propagate the flag through the stages of the graphics pipeline, the flag may be communicated between the rendering units 202 as those units perform tasks as part of the graphics pipeline.

For example, each unit 202 may receive a task (e.g. from the command engine 204 or some other scheduler) and execute that task as part of a pipeline stage. Tasks forming part of the graphics workload for item A may be associated with the set flag so that both the task and the associated flag are communicated to the rendering units. In other words, work tasks forming part of the workload to render item A may be communicated to the processing units 202 along with the set flag (e.g. in the form of an additional bit). The rendering units can then use the set flag to determine that they are executing a task that forms part of the work to render item A.

The flag may be propagated through each stage of the graphics pipeline. For example, if the flag is associated with the draw call for item A, the flag can be propagated through each stage of the pipeline from the head of the geometry processing stage (e.g. from the command engine 204) through to the end of the rasterization stage (e.g. writing pixel data to a frame buffer).

It may be the case that a parent, or root task associated with a relatively early stage of the graphics pipeline may spawn multiple child, or branch tasks at a later stage of the pipeline. In this case, the rendering circuitry 116 may be configured so that each task spawned from a root task associated with the flag is also associated with the flag. For example, a graphics pipeline typically includes a geometry processing phase and a rasterization phase. Tasks forming part of the geometry processing phase of the graphics pipeline tend to operate on primitive data, whereas tasks forming part of the rasterization phase of the graphics pipeline tend to operate on fragment or vertex data, where a single primitive may cover multiple fragments (and be defined by multiple vertices). If the set flag is associated with a draw call to render a geometric item, the flag is set ahead of that geometric item being submitted to the graphics pipeline. The flag is therefore associated with each task performed as part of the geometry processing phase to render geometric item A. As part of the transition between geometry and rasterization phases of the graphics pipeline, primitives may be sampled to determine which elementary areas (e.g. pixels) the primitive is present in, and a fragment may be generated for each of the elementary areas in which the primitive is determined to be present. The generated fragments may then be processed in the rasterization phase of the graphics pipeline. Thus, multiple fragments may be generated from a single primitive. The indication represented by the value of the flag associated with the primitive is transferred to a corresponding flag for each fragment generated or derived from the primitive. For example, a primitive with a set flag may generate multiple fragments with set flags, and a primitive with a clear flag (i.e. a flag which is not set) may generate fragments with clear flags. This means the set flag can be propagated from the geometry processing phase through to the rasterization stage. This may allow each task performed as part of the rasterization phase to render the geometric item A to be associated with the flag.

Tasks may also be associated with a flag by virtue of the data those tasks operate on. For example, data generated from a task required to perform the flagged rendering task may be flagged (i.e., associated with the set flag). A subsequent task that uses that data in some way is then also associated with the set flag. Flagged data generated at one stage of the pipeline may spawn multiple elements of data used in a subsequent stage of the pipeline that inherits that flag. That is, the rendering circuitry may be configured so that each element of data spawned from a data element associated with the flag is also associated with the flag. As an example, each element of fragment data spawned from a primitive associated with a flag is also associated with a flag.

In this regard it will be appreciated why it may be advantageous to associate the flag with the draw call for the geometric item, because it allows every work task required to render that item to be associated with the flag, and potentially each element of data generated from those tasks.

Associating the flag with the geometric item early in the pipeline may also enable the flags to more accurately identify the work tasks required to render the geometric item during later stages of the pipeline as those flags are propagated through the pipeline. This may be particularly true when work to render the item is not performed serially but instead is performed in parallel or in accordance with a load balancing scheme.

For example, in a tile-based graphics pipeline (i.e. a pipeline which includes a tiling stage), the flag may be associated with the geometric item A before the item passes through the tiling stage (i.e. the flag is associated with the item upstream of the tiling stage of the pipeline). The tiling stage typically forms part of the geometry processing phase of the pipeline. The flag can then be propagated from the geometry processing phase to the rasterization phase. During the rasterization phase each tile may be rendered in turn, and the geometric item A may span multiple tiles. If the flag is associated with the geometric item before the tiling stage, the flag may form part of the tiling data for each tile that contains the item. Thus as each tile is rendered in turn, the flag can be used to identify tasks forming part of the workload for item A, even when that workload is distributed across multiple tiles.

The counters 118 are configured to count events that occur whilst the rendering units performs tasks associated with the flag. In other words, the counters are configured to count the occurrences of a number of events as a result of performing the rendering task (i.e. in this example, rendering geometric item A).

More specifically, each counter 118 is associated with a rendering unit 202. Each counter is configured to change in value by a set amount in response to an occurrence of an event whilst its associated rendering unit performs work associated with the flag for item A. The counter could for example increment or decrement (e.g. by one) in response to the occurrence of an event. If an event occurs whilst the unit performs work not associated with the flag, the counter does not change in value. In this way the counters count only the number of events that occur during the workload of rendering item A. The number of events that occurred as a result of rendering item A can be used to profile the performance of the graphics unit 104.

An 'event' may be a particular activity occurring within the hardware of the rendering units or software code executed by those units. An event could include, for example, a cache hit; a cache miss or a processor unit clock cycle/pulse. Alternatively, the event could be the generation of a primitive; the clipping of a primitive, or the culling of a primitive. The event could be the generation of a vertex or the processing of a vertex. Alternatively an event could include the invocation of a shader (e.g. a vertex, Hull, domain, geometry, clipper or pixel shader); the depth testing of a pixel fragment during the rasterization phase; the execution of an instruction by an instruction decoder; or a texture request. Alternatively, an event may be a particular outcome of a test, such as a depth test. For example, an event may occur when a pixel fragment passes the depth test, but not when a pixel fragment fails the depth test, or vice versa. An event could therefore be a particular path being taken at a conditional branch. An 'event' may therefore not necessarily be work done, but could be the outcome of an item of work.

Figure 3:
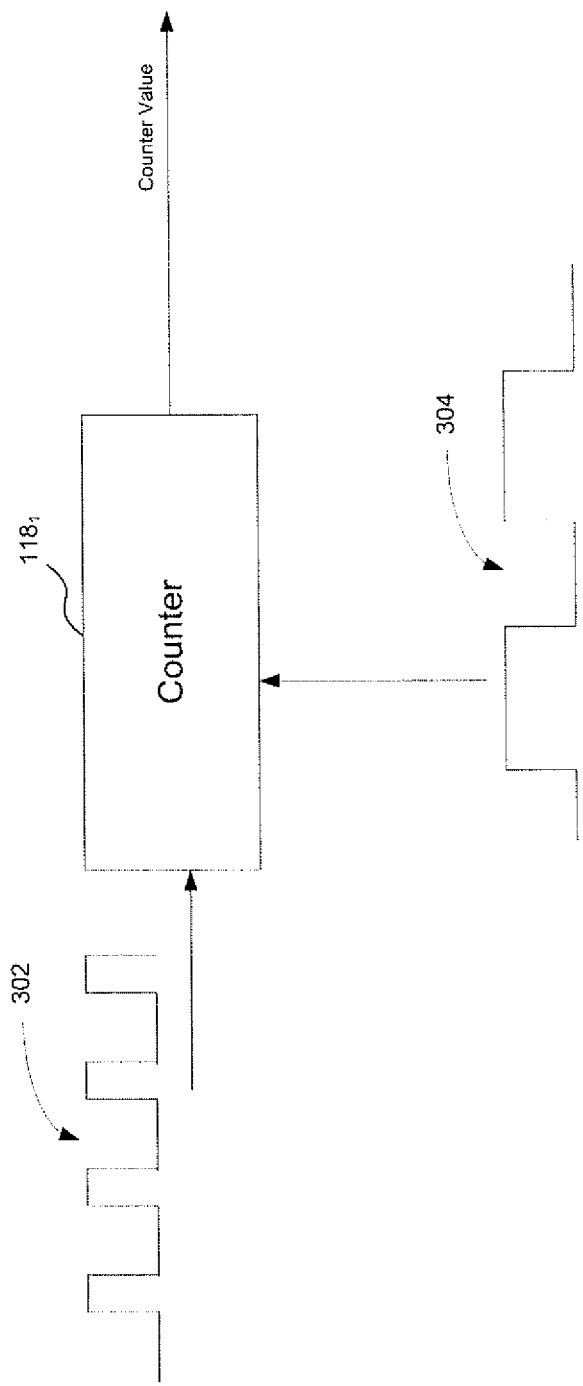
FIG. 3 shows the operation of a counter to count the occurrences of an event when performing work associated with a flag.

An example of how a counter operates is shown in FIG. 3. FIG. 3 shows counter $118_1$ for the purposes of illustration, which is associated with the unit of rendering circuitry $201_1$.

Here, the counter receives an event signal 302 indicating the occurrence of a particular event at rendering circuitry $201_1$. The flag takes the form of a flag signal 304 that indicates whether the task or item of data currently being processed at rendering circuitry $201_1$ has associated with it a set flag indicating that that processing is part of the workload relating to the rendering of item A. The counter is configured to receive as inputs both the signal 302 and the signal 304. If the counter $118_1$ receives an event signal indicating the occurrence of an event whilst also receiving a flag signal indicating that the flag associated with item A is set, the counter changes value (e.g. it increments or decrements by one). If the event signal 302 indicates the occurrence of an event but the flag signal indicates that the flag associated with item A is not set, the counter does not change value. Likewise, if the signal 304 indicates that the flag is set but the event signal does not indicate the occurrence of an event, the counter does not change in value. For example, the counter may only be enabled in response to receiving a signal indicating that the flag is set, and may be disabled at all other times. Thus the flag may operate to enable the counter.

The rendering unit (e.g. unit $202_1$) generates the flag signal 304 in response to receiving an item of work (or data associated with that item of work) and the flag bit associated with that work item (or the flag bit associated with data associated with that work item). The unit may set the flag for the duration that it is performing the item of work associated with the flag. When the processing unit receives an item of work not associated with the flag, it does not set the flag and thus the counter does not change value.

In the example shown in FIG. 2, the graphics system comprises a plurality of counters. This may be advantageous in enabling multiple metrics associated with the performance of the graphics unit to be measured. Each counter may be associated with a different stage of the graphics pipeline. Each counter may therefore be configured to count a particular type of event; i.e. each counter may count a different event (e.g. an event associated with a different stage of the pipeline). This can enable performance metrics associated with different parts of the pipeline to be measured, which may be useful for developers to identify stages of the pipeline contributing to a performance shortfall. For example, rendering item A may result in a relatively low number of primitives being generated by the geometry shaders, but relatively large numbers of texture cache misses.

As discussed above, one or more of the units 202 may be configured to perform more than one stage of the graphics pipeline. For example, unit $202_2$ may be a universal shader engine that is capable of executing both vertex shading operations and pixel shading operations. Thus though not shown in FIG. 2, at least one of the units could be associated with a plurality of counters. In general, one or more of the rendering units 202 may be associated with a respective set of multiple counters. For example, a rendering unit may be associated with a first counter configured to count events occurring as a result of the unit executing processing tasks on pixel data; and a second counter configured to count events occurring as a result of that same unit executing processing tasks on vertex data.

In other examples, the graphics unit may contain only a single counter.

The counter reader 120 is configured to read the values of the counters 118. In so doing, the counter reader obtains a measure of the number of occurrences for each of the set of events measured by the counters caused by rendering geometric item A as part of the scene. The values of each of the counters could be collated into a single result and output, for example on a display to the user of the system 100. The counter values could be summed together to produce a single result. For example, if the event associated with each of a plurality of counters was a processor clock cycle, the values of each of these counters could be summed to give the total number of processor clock cycles required to perform the flagged rendering task (in this example render geometric item A.)

The above example illustrates how the performance of a graphics unit can be profiled to obtain measurements of certain parameters as a result of rendering a particular portion of a scene. By using flags associated with the scene portion and propagating those flags through the pipeline, work (e.g. in the form of processing tasks) required to render that portion of the scene can be identified and thus events occurring as a result of performing that work can be counted. This allows the work the graphics unit must undertake to render the portion of the scene to be profiled. In other examples, the flags may not be associated with a draw call to render a particular geometric object of the scene (as in the above example), but could be associated with some other rendering task that comprises a portion of work required to render the scene (such as a call to clear the canvas onto which the scene is to be rendered). The association of the flag to these other examples of rendering tasks and the propagation of those flags through the pipeline may occur in a similar way to those described above.

An example of how the performance of a graphics unit may be profiled for a more specific graphics pipeline will now be described with reference to FIGS. 4-6.

Figure 4:
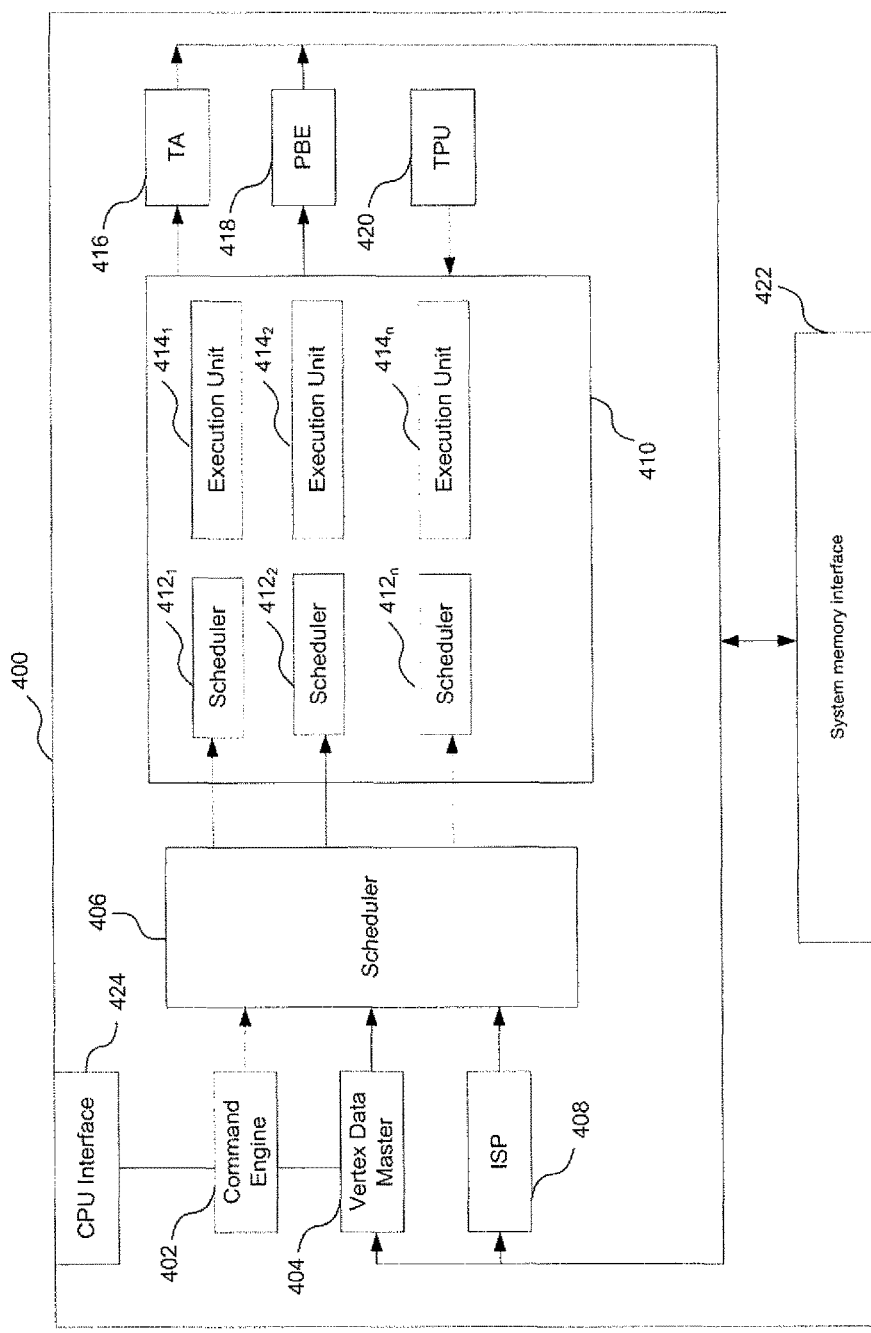
FIG. 4 shows an example implementation of the rendering circuitry.
Figure 5:
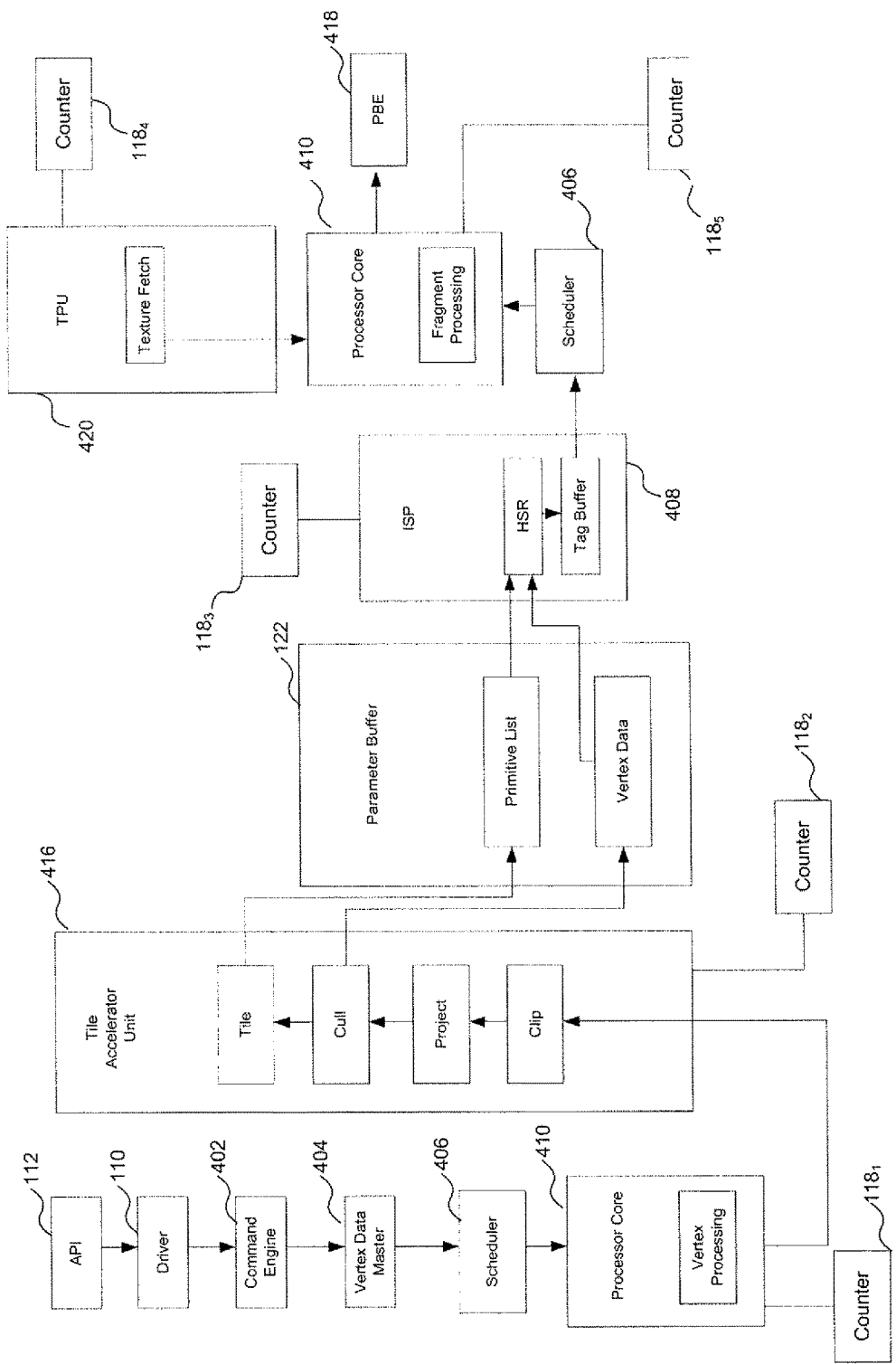
FIG. 5 shows how the rendering circuitry of FIG. 4 maps to a tile-based rendering graphics pipeline.

FIG. 4 shows a more specific example implementation of the rendering circuitry 116, and FIG. 5 shows an example of how the hardware of FIG. 4 maps to a tile-based rendering graphics pipeline.

Turning now to FIG. 4, there is shown rendering circuitry 400. The circuitry comprises a command engine 402 coupled to a vertex data master 404. The vertex data master is coupled to a scheduler 406. The circuitry further comprises an image synthesis processor (ISP) 408 coupled to the scheduler 406. Scheduler 406 may be referred to as a coarse-grain scheduler. The scheduler 406 is coupled to a processor core 410 that comprises a plurality of scheduler units $412_{1,2,\ldots,n}$ coupled to respective execution units $414_{1,2,\ldots,n}$. Each execution unit 414 may comprise a plurality of arithmetic logic units (ALUs) arranged in parallel. The scheduling units 412 may be referred to as fine-grain schedulers. Each of the execution units 414 may be capable of executing vertex, fragment and general graphics instructions. As such, the processor core may be referred to as a universal shader engine. The processor core 410 is coupled to a tile accelerator (TA) 416, a pixel back end (PBE) 418 and a texture processing unit (TPU) 420. The vertex data master 404; ISP 408; scheduler 406; processor core 410; TA 416; PBE 418 and TPU 420 are all examples of the rendering circuitry units 202 shown in FIG. 2.

Each of the tile accelerator 416, PBE 418 and texture processing unit 420 are coupled to a system memory interface 422 that interfaces with the system memory 106.

The rendering circuitry further comprises a CPU interface 424 that interfaces with the host CPU 102 of the computing apparatus. In particular, the CPU interface may interface with the graphics driver 110 that is run on the CPU 102.

The command engine 402 receives and processes drawing commands from the driver 110 to render geometric objects of the scene for display. The command engine submits instructions and geometry data (including vertex data) for the drawing command to the vertex data master 404. Thus the command engine may submit geometry data for the geometric object specified by the drawing command. The vertex data master receives streams of vertex data and submits vertex tasks to the scheduler 406 that are required to perform the drawing command. The scheduler 406 may operate to break these tasks into smaller sub-tasks and distribute those sub-tasks to available schedulers 412 of the processing core 410. The execution units 414 then execute, or process the vertex sub-tasks distributed to it from its associated scheduler 412. The execution units may execute these vertex sub-tasks to transform the received vertex data from 3D model space to 2D screen space. The transformed vertex data is then communicated to the tiling accelerator 416. Thus the transformed vertex data represents the geometric data for the one or more geometric objects specified by the drawing command transformed to 2D screen space, and so may be referred to as transformed geometric data.

The tiling accelerator 416 may apply a number of operations to the transformed geometric data, such as clipping, projection and culling. The TA 416 also performs tiling on the transformed primitives determined to be visible after the clipping, projection and culling. To perform the tiling, the TA updates a display list for each tile that the primitives of the transformed geometric data cover, where the display list for each tile contains a list of each primitive that at least partially overlaps that tile. The TA also writes out the transformed data for the visible primitives. The transformed data and updated display lists may be written to (and hence stored within) parameter buffer 122 in the system memory 106.

These steps performed by the vertex data master, processor core and TA may be referred to as the geometry processing phase.

The above steps may be repeated for each drawing command required to render the scene until all of the scene's geometry (i.e. all of the geometric items forming the scene) has been processed by the TA 416.

Once the geometry processing phase has been completed, the rasterization, or fragment processing, phase begins. During the rasterization phase, the data stored in the parameter buffer is processed on a per-tile basis; i.e. the scene is rendered per-tile.

To initiate the rasterization phase for a tile, a tile task is communicated to the image synthesis processor 408. The ISP may perform a hidden surface removal (HSR) on each primitive referenced by the tile being processed (i.e. each primitive listed in the display list for the tile being processed). The hidden surface removal is performed on a per-fragment basis for each primitive. The ISP may use a tag buffer to track all visible fragments determined by the HSR and the primitives to which they belong. Once the HSR has been completed for the tile, the tag buffer contains a list of each visible fragment and the primitives that it belongs to.

The ISP then submits fragment processing tasks for the visible fragments for the tile to the scheduler 406. The scheduler 406 may again divide the fragment processing tasks into fragment sub-tasks that are distributed to the schedulers 412 of available execution units 414 of the processor core 410. The fragment sub-tasks could include performing pixel shading (i.e. invoking pixel shaders) and texturing. For example, the execution units 414 may perform texture reads, with the texture data fetched by the texture processing unit 420. Once the fragment sub-tasks for the tile have been executed by the processor core 410, the fragment data is communicated to the PBE 418. The PBE may apply final processing to the fragments of the tile and then flushes the fragment data for the tile to a frame buffer the system memory 106.

FIG. 5 illustrates how the hardware of the rendering circuitry shown in FIG. 4 maps onto a tile-based graphics pipeline to render a scene. FIG. 5 further shows a plurality of counters 118 associated with the rendering units. It will be noted that some of the rendering units (e.g. the processor core 410) are associated with more than one counter, with each counter nevertheless associated with a different stage of the graphics pipeline.

An illustration of how the performance of the graphics unit can be profiled when implementing the pipeline shown in FIG. 5 to render a scene will now be described with reference to FIG. 6.

Figure 6:
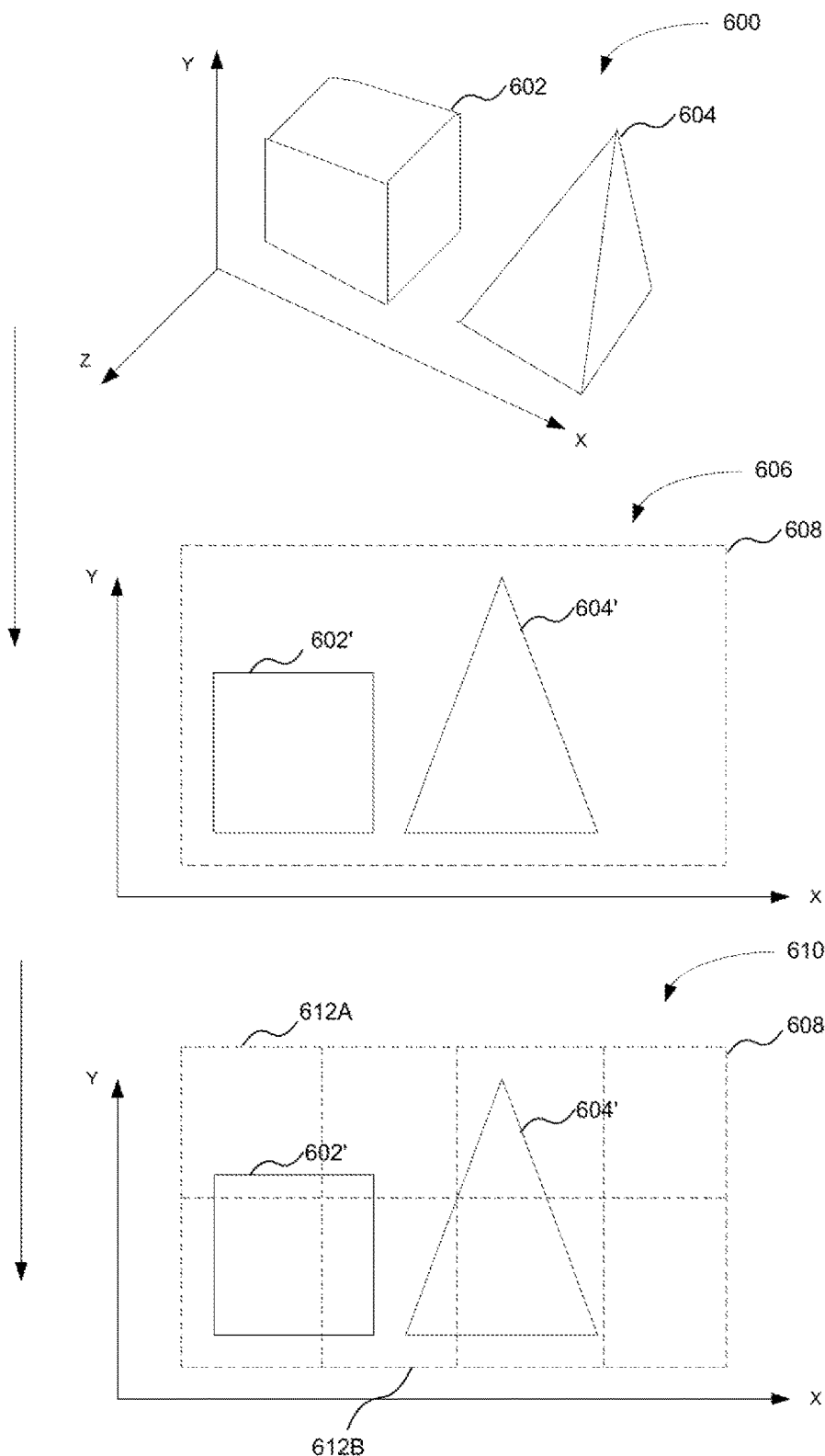
FIG. 6 shows a schematic illustration of the transformation of geometric objects from model space to screen space in order to render a scene.

FIG. 6 shows a scene 600 to be rendered. The scene is composed of two geometric items, or objects, in model space denoted 602 and 604. In this example, the rendering task to be flagged is a draw call to render object 602.

Turning back now to FIG. 5, to begin the API 112 issues a draw command, or draw call to draw item 602. In this example the API has previously issued a draw command to draw item 604. The draw call for item 602 is received by the graphics driver 110 and translated into a command to render item 602 that is communicated to the command engine 402 of the graphics unit. That command may include the geometry data for item 602 (e.g. its vertex data, and colour data).

The driver 110 includes within the command to render item 602 a set flag. The flag could for example be a single bit. A set flag may be represented by either a value of '1' or '0' for the single bit. The set flag is therefore associated with the graphical object 602 and is included within the command issued to the graphics unit to draw that object. It is noted that the previous command to draw item 604 that was submitted to the command engine 402 did not contain a set flag bit. Thus in this example the driver 110 operates as a tagging unit.

The vertex data master 404 receives the command from the command engine 402 and the vertex data for the geometric item 602. The vertex data master then submits vertex processing tasks required to render item 602 to the scheduler 406. The vertex data master communicates the flag with each of the vertex processing tasks for item 602 to the scheduler. For example, the vertex data master may communicate the flag with each task issued to the scheduler, or it may include the flag within each task.

The scheduler 406 receives the vertex tasks from the vertex data master. The scheduler then subdivides each vertex tasks into vertex sub-tasks and distributes those to available schedulers of the processor core 410. The scheduler 406 is configured to communicate a flag to the schedulers of the processor core 410 along with each sub-task generated, or spawned, from a vertex task associated with that flag. That is, if the scheduler receives a vertex task associated with a flag (i.e. in this example a vertex task for the item 602), the scheduler associates each sub-task generated from that task with the flag. Thus the scheduler 406 communicates both a vertex sub-task and a flag to available schedulers of the processor core 410 for each sub-task required to render the item 602. In this way the execution units of the processor core 410 can identify tasks associated with the geometric object 602.

It will be appreciated that the scheduler 406 may distribute vertex sub-tasks for both geometric item 602 and item 604. The execution units 414 of the processor core 410 execute the sub-tasks received from the scheduler 406 to transform received vertex data from model space to a space (e.g. clip space) suitable for input to the tile accelerator (TA) unit 416. With respect to our current example, the execution units 414 followed by TA unit 416 perform the sub-tasks to transform the objects 602 and 604 from model space (depicted at 600) to two-dimensional screen space depicted at 606. That is, the combination of the sub-tasks performed by the execution units 414 and the TA unit 416 transform the objects from model space to screen space. The geometric objects are denoted in this screen space as 602' and 604', and the boundary of the image to be rendered is denoted at 608.

Counter $118_1$ is associated with the processor core 410. Counter $118_1$ is configured to change value (e.g. increment) by a set amount (e.g. one) each time an event occurs whilst the processor core performs a task or item of work that is associated with the set flag of the geometric object 602. The flag may for example function to enable counter $118_1$. In this context, the event could for example be the invocation of a vertex shader. That is, each time the processor core 410 invokes a vertex shader to perform a vertex task for the object 602, counter $118_1$ may increment. As another example, the event could be the execution or decoding of a vertex processing instruction; i.e. each time the processor core 410 decodes, or executes a vertex processing instruction tagged by the flag, the counter $118_1$ increments.

Turning back to the pipeline, the transformed geometric data for objects 602' and 604' is then communicated to the tile accelerator unit 416. The transformed geometric data for item 602 is associated with the set flag. The flag may be communicated along with its associated geometric data to the TA unit 416. A flag may be associated with each transformed vertex of the item 602. Alternatively, a single flag may be associated with the set of transformed geometric data for the item 602 (i.e. the set of data defining the item 602 in screen space). This may be advantageous in reducing the memory requirements when storing the flags.

The TA unit 416 applies a number of operations to the transformed geometric data, including in this example clipping, projection and culling. After projection the objects have been transformed into the screen space depicted at 606. These set of stages may be referred to as a primitive pipeline. The primitive pipeline may also include a primitive assembly stage in which primitives for the transformed geometric objects are assembled from the transformed geometric data for those objects. The set flag is communicated, or propagated, along each stage of the primitive pipeline with the transformed geometric data for item 602. That is, the set flag associated with item 602 is propagated along each stage of the primitive pipeline along with the transformed geometric data for the item 602. Thus, at any stage of the primitive pipeline, processing operations performed for the item 602 (including primitive assembly) can be identified by the set flag. In addition, each primitive generated from the transformed geometric object 602' may be associated with a set flag since the object 602' itself was associated with a set flag. Thus the primitives spawned from the transformed geometric object may be said to inherit the flag associated with that object.

The TA unit also performs a tiling stage. In the tiling stage, the transformed image of the scene in screen space is subdivided into a plurality of tiles. This is illustrated in FIG. 6 at 610, which shows the image in screen space divided into an array of eight tiles. It is noted that for clarity, in this figure the geometric objects are not shown divided into primitives, but rather are in 'whole object' form.

The TA unit is configured to generate a primitive list (also referred to as a display list) for each tile that lists an indication of each primitive that at least partially overlaps that tile. For example, the display list for tile $612_A$ contains an indication of primitive(s) belonging to item 602' (e.g. a primitive tag, or ID); and the display list for tile $612_B$ contains an indication of the primitives forming part of items 602' and 604' that overlap that tile.

The TA unit is associated with counter $118_2$. Counter $118_2$ is configured to change in value (e.g. increment) each time an event associated with the TA stage of the pipeline occurs whilst the TA unit performs a task tagged by the set flag (i.e. a task required to render the geometric object 602). The event in this context could for example be the generation of a primitive in the primitive assembly stage; the culling of a primitive in the culling stage of the primitive processing pipeline; the passing of a primitive through the culling stage or the clipping of a primitive at the clipping stage. It will be appreciated that though only one counter is shown connected to the TA unit 416, in other examples there may be a plurality of counters associated with the unit, each configured to measure the occurrences of a respective event associated with the TA stage of the pipeline.

Turning back to FIG. 5, the TA unit then writes the display lists for each tile and the primitive data for each primitive contained within the display lists to a parameter buffer 122 in system memory 106. This data may be referred to as intermediate data that separates the geometry and rasterization phases of the graphics pipeline. That is, the parameter buffer in system memory stores intermediate data between the geometry and rasterization stages of the graphics pipeline. This intermediate data is generated by the geometry processing phase and used to initiate the rasterization phase.

The primitive data for each primitive forming part of the geometric item 602 may be associated with the set flag in the parameter buffer. To reduce the memory requirements, a single flag may be associated with a block of primitive data. A primitive block may contain data for a plurality of primitives of the transformed geometric items. A flag may be associated with each primitive block that contains data for at least one primitive forming the transformed geometric item 602'.

Alternatively, a flag may be stored in the parameter buffer for each primitive forming part of the transformed geometric item 602'. In general, a set flag may be stored in the parameter buffer in association with, or as part of, the intermediate data generated from performing the geometry processing phase of the pipeline on the geometric item 602. This allows the fragment processing tasks forming part of the rasterization phase for the geometric item 602 to be identified by the flags. Conveniently, in this example the set flag is associated with the rendering task (a draw call to render item 602) upstream of, or before, the tiling stage of the graphics pipeline. That is, at least a subset of the work defined by the rendering task that occurs prior to the tiling stage is associated with the set flag. The flag is then propagated from the geometry processing phase of the pipeline to the rasterization phase of the pipeline via the parameter buffer. Thus work done as part of the rendering task can be flagged in both the geometry processing and rasterization phases. This enables work required to perform the rendering task to be readily tracked in the rasterization phase even when that work may be distributed across multiple tiles that are rendered in turn.

To begin the fragment processing phase of the pipeline, the ISP 408 receives a tile task for a tile of the image. The ISP accesses the intermediate data for that tile from the parameter buffer. The ISP may use the primitive list for the tile to access the data for the primitives in that primitive list that is stored in the parameter buffer. The ISP may then perform a number of processing tasks for the tile, such as hidden surface removal. The ISP may perform the hidden surface removal on each primitive in turn listed in that tile's display list. For each primitive being processed, the ISP may sample the primitive to generate fragments and then perform a per-fragment depth test to determine whether each fragment of that primitive is visible. Once the processing tasks for each primitive in that tile's display list has been completed, the ISP has obtained information on each visible fragment of the image and the primitive to which that fragment belongs.

If the primitive data for the primitives forming the geometric object 602 is associated with the set flag in the parameter buffer, that flag may be communicated to the ISP along with the primitive data. For example, if the ISP 408 is processing tile 612B, it may retrieve from the parameter buffer the primitive data for the primitives forming part of transformed objects 602' and 604' that overlap that tile. The ISP also retrieves from the parameter buffer the set flag associated with the primitive data for the primitives forming part of object 602' that overlap that tile. This allows each per-fragment depth test performed by the ISP for primitives of the object 602' to be identified. It also allows each subsequent fragment generated from each flagged primitive to also be flagged. That is, each element of fragment data generated from a flagged primitive may inherit the flag of that primitive.

The ISP 408 is associated with the counter $118_3$. The counter $118_3$ is configured to change in value (e.g. increment) in response to the occurrence of an event whilst the ISP performs a task forming part of the workload to render the object 602 (i.e. tasks associated with the flag). As indicated in the above paragraph, an event in this context could be the depth testing of a fragment. In other words, each time the ISP performs a depth test on a fragment forming part of a primitive for the object 602', the counter changes value, e.g. by incrementing by one. Alternatively, the event could be the processing of a primitive by the ISP. The ISP could be associated with two counters, each configured to increment in response to one of those events.

Once the ISP has completed the processing tasks for each primitive in that tile's display list, the ISP submits the fragment data for the visible fragments in the tile to the scheduler 406. The ISP may group the fragment data into data blocks, where each data block contains the fragment data for visible fragments belonging to the same primitive. For primitives forming part of the transformed geometric item 602', the fragment data block may contain, or otherwise be communicated with, the flag. A single flag may be associated/communicated with each block of fragment data for a primitive of the geometric item 602'. Thus the transformed geometric object 602' may at this stage have a plurality of flags associated with it (one flag per primitive containing at least one visible fragment). The ISP further communicates fragment tasks to the scheduler 406. The ISP may communicate a fragment task for each fragment data block.

The scheduler 406 receives the fragment data for the visible fragments of the tile and fragment tasks. The scheduler 406 may receive a flag for each fragment task required to render item 602', i.e. for each task forming part of the fragment processing workload to render the object 602'.

The scheduler 406 then subdivides each fragment task into fragment processing sub-tasks to distribute to available schedulers 414 of the processor core 410. The scheduler 406 is configured to communicate the flag to the schedulers of the processor core 410 along with each sub-task generated from a fragment task associated with that flag. That is, if the scheduler receives a fragment task associated with a flag (i.e. in this example a fragment task required to render the item 602'), the scheduler 406 associates each sub-task spawned from that task with the flag. Thus the scheduler 406 communicates both a fragment sub-task and a flag to available schedulers of the processor core 410 for each sub-task required to render the item 602'. Thus fragment tasks associated with the transformed geometric item 602' can be identified.

Thus, the scheduler 406 is in general capable of receiving tasks, and subdividing those tasks into smaller tasks (or equivalently, sub-tasks) to be distributed to the processor core 410. Those tasks could be vertex tasks or fragment tasks. If the scheduler receives a task associated with the set flag, it communicates an indication of that flag with sub-task generated from that task to the processor core (and in particular to the available schedulers of the processor core).

Returning back to the pipeline, the processor core 410 receives the fragment tasks from the scheduler 406 and performs texturing and/or shading operations on the received fragments. If texture data is needed as part of a texturing operation, this can be retrieved from the TPU 420. Thus the TPU 420 may be invoked by the core 410 as necessary in order to complete a texturing operation. The processor core 410 may invoke the TPU 420 by issuing a texture fetch task to the TPU. The processor core 410 may communicate the set flag with each texture fetch task that relates to a flagged fragment. In this example, this would be each fragment generated from a primitive of the transformed geometric object 602'.

The TPU 420 receives the texture fetch tasks from the processor core (and the set flag, where appropriate). In response to receiving a texture fetch task, the TPU may fetch texture data (e.g. from a texture cache). Counter $118_4$ is configured to change in value (e.g. increment) each time an event occurs whilst the TPU 420 performs a task associated with the flag. In this case, the event could for example be a texture fetch, or the receipt of a texture fetch request. Thus counter $118_4$ may count the number of texture fetches required to render the object 602'.

Counter $118_5$ is configured to change in value (e.g. increment) in response to each occurrence of an event whilst the processor core performs a work task required to complete the flagged rendering task. In the context of this example, counter $118_5$ is configured to change in value in response to each occurrence of an event whilst the processor core performs a task forming part of the workload to render the object 602'. That work task is an item of work forming part of the fragment processing phase of the pipeline, such as texturing or shading. The event could be, for example, the invocation of a pixel shader, or the number of fragment processing instructions, or tasks, executed or decoded by the processor core. It will be noted that processor core 410 therefore has two counters associated with it in this example: counter $118_1$ and counter $118_2$. Each of these counters is configured to count an event associated with a different stage of the graphics pipeline—in this example an event associated with the geometry processing phase of the pipeline and an event associated with the fragment processing phase of the pipeline.

Once a fragment task has been executed by the processor core 410, the resultant fragment data is passed to the PBE 418, which may apply final processing to the fragments of the tile before writing the fragment data for the tile to the frame buffer in system memory 106.

A counter reader (not shown in FIG. 5) is configured to read the values of each of the counters $118_{1-5}$. The reader could be configured to collate each of those readings into a single result, for example for output on a display. By having a plurality of counters associated with different stages of the graphics pipeline (and different stages of the hardware units that implement that pipeline), more complete performance information for the graphics unit can be collected. This is because each of the plurality of counters can be configured to count a respective event associated with different stages of the pipeline. If the flag is associated with the scene portion upstream of the tiling stage of the pipeline (as in the examples above), then events associated with both the geometry processing phase and the fragment processing phase during rendering of the scene can be counted. For example, one or more counters can be associated with rendering units that perform stages of the geometry processing phase (and so be configured to count events associated with the geometry processing phase), and one or more counters can be associated with rendering units that perform stages of the fragment processing phase of the pipeline (and so be configured to count events associated with the fragment processing phase). Propagating an indication of the flag from the geometry processing phase through to the fragment processing phase may be particularly beneficial for tile-based rendering pipelines when the work associated with rendering a chosen portion of the scene may be split across multiple tiles, where it may not be straightforward to know when the graphics unit is performing work to render that scene portion.

Figure 7:
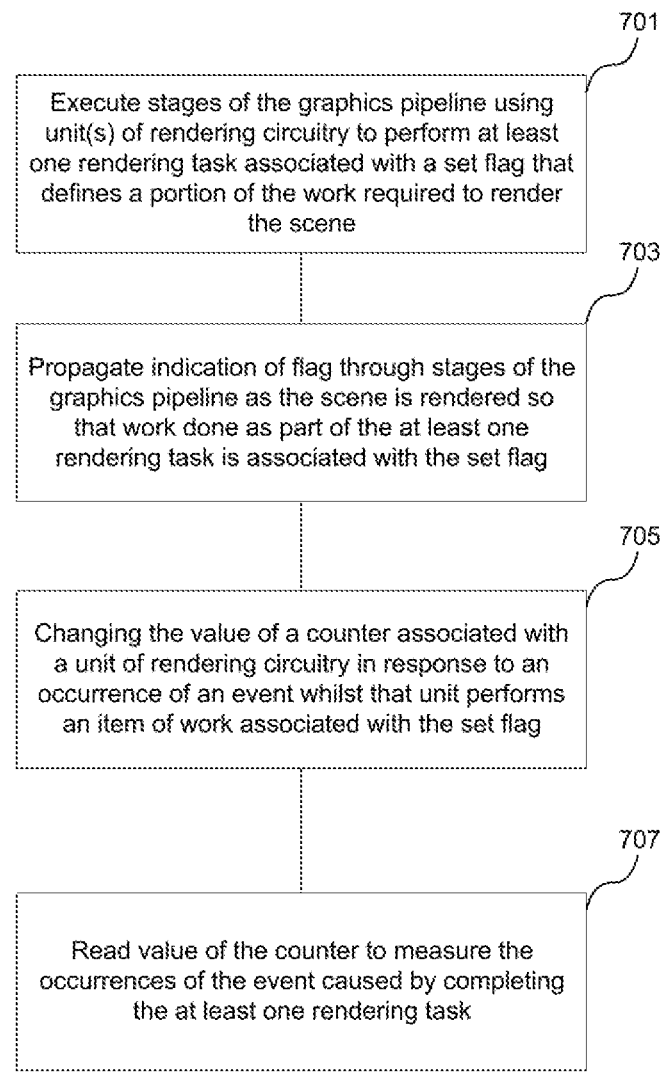
FIG. 7 shows a flowchart of steps for profiling the performance of the graphics unit when rendering a scene according to a graphics pipeline.

FIG. 7 shows a flowchart outlining method steps for profiling the performance of a graphics unit in accordance with the examples described herein.

At step 701, stages of the graphics pipeline are executed using one or more units of rendering circuitry to perform at least one rendering task associated with a set flag that defines a portion of the work required to render a scene.

As described herein, the rendering task could be a draw call. The draw call could be a command to draw a portion of a scene, e.g. one or more geometric objects forming part of the scene. Alternatively, the draw call that is flagged may not result in the rendering of any component of the scene when performed, but is nevertheless required to be performed in order for the scene to be rendered. An example of such a draw call could be a 'wipe', or 'clear' function that clears the results of a previous render. The rendering task to be flagged may be specified via the API. The flag may be associated with rendering task(s) by a flagging unit, which may be the graphics driver. The at least one rendering task could include a single draw call or multiple draw calls, and the set flag may be associated with that draw call or with each of those draw calls. The flag may be a single bit, and may be set when the bit takes a certain value (e.g. '1' or '0'). The flag can be included within the command to render the scene portion specified by the draw call that is issued to the graphics pipeline.

As described above, the pipeline could be a tile-based rendering pipeline. It may for instance be a tile-based deferred rendering pipeline. Alternatively the pipeline could be a non-tile based pipeline such as an immediate mode rendering pipeline.

At step 703, an indication of the flag is propagated through stages of the graphics pipeline as the scene is rendered so that work done as part of the at least one rendering task is associated with the set flag.

An indication of the flag may be propagated through each stage of the graphics pipeline. The flag may be communicated by passing the flag bit or a value corresponding to the flag between the units of rendering circuitry as those units perform stages of the graphics pipeline. As described in the examples above, the flag could be communicated along with items of work (e.g. instructions, or processing tasks) to be performed by the rendering units. Items of work may also (or alternatively) be associated with the set flag by virtue of the data those items of work operate on, or otherwise interact with. For example, data indicating the set flag could be stored in memory (e.g. system memory) in association with data generated from performing the flagged rendering task. That data could be geometry and/or vertex data for a scene portion indicated by the rendering task. It could include data submitted by the graphics driver and also data generated by the graphics pipeline as the flagged rendering task is performed. When a unit of rendering circuitry performs a work task as part of a stage of the pipeline as part of the rendering task, it may access data stored in the memory and see the stored data is associated with the flag. Thus the unit of rendering circuitry can determine that a work task it is performing forms part of the workload for the flagged rendering task without physically receiving the flag bit if it accesses data stored in memory associated with the flag.

At step 705, a counter associated with a unit of rendering circuitry is changed in value in response to the occurrence of an event whilst that unit performs an item of work associated with the set flag.

The counters could increment by one each time an event occurs whilst performing work associated with the set flag. Alternatively, the counters could decrement by one. Not all of the counters need to change value in the same way: a subset may increment in response to an event whilst another subset may decrement, for example. An item of work could also be referred to as a work task. A work task refers to any tasks performed by the graphics unit as described herein, and covers different hierarchies of tasks, such as tasks and sub-tasks spawned from those tasks. A work task could for example be a processing job, or processing task (e.g. a vertex or fragment processing task). Alternatively, a work task could be decoding an instruction, or accessing data in memory (e.g. a texture access) etc. The counters could be hardware counters. The counters could be enabled in response to the set flag and disabled at other times. The flag may as such operate as a counter-enable bit. Multiple counters could be distributed across different stages of the pipeline for measuring events associated with different stages of the pipeline. One or more of the rendering circuitry units could be associated with multiple counters. For example, a unit could be associated with two counters for counting events associated with different stages of the graphics pipeline (e.g. if the unit was a processor unit capable of performing both vertex and fragment processing tasks).

At step 707, the value of the counter is read to measure the occurrences of the event caused by completing the flagged rendering task.

If there are multiple counters, the value of each of these counters may be read. The read values of the counters could be output for display, e.g. on a user interface of the computer system. This enables the performance data for the graphics unit when rendering the selected portion of the scene to be read and analysed.

The computing apparatus and graphics units of FIGS. 1-5 are shown as comprising a number of functional blocks. This is schematic only and is not intended to define a strict division between different logic elements of such entities. Each functional block may be provided in any suitable manner. It is to be understood that intermediate values described herein as being formed by a unit or block of the computing apparatus or graphics unit need not be physically generated by the unit/block at any point and may merely represent logical values which conveniently describe the processing performed by the unit/block between its input and output.

Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a graphics unit configured to perform any of the methods described herein, or to manufacture a any computing apparatus comprising a graphics unit as described herein. An integrated circuit definition dataset may be, for example, an integrated circuit description.

There may be provided a method of manufacturing, at an integrated circuit manufacturing system, a graphics unit as described herein, or a computing apparatus comprising a graphics unit as described herein. There may be provided an integrated circuit definition dataset that, when processed in an integrated circuit manufacturing system, causes the method of manufacturing a graphics unit to be performed. There may also be provided an integrated circuit definition dataset that, when processed in an integrated circuit manufacturing system, causes the method of manufacturing a computing apparatus to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics unit, or a computing apparatus comprising a graphics unit, will now be described with respect to FIG. 8.

Figure 8:
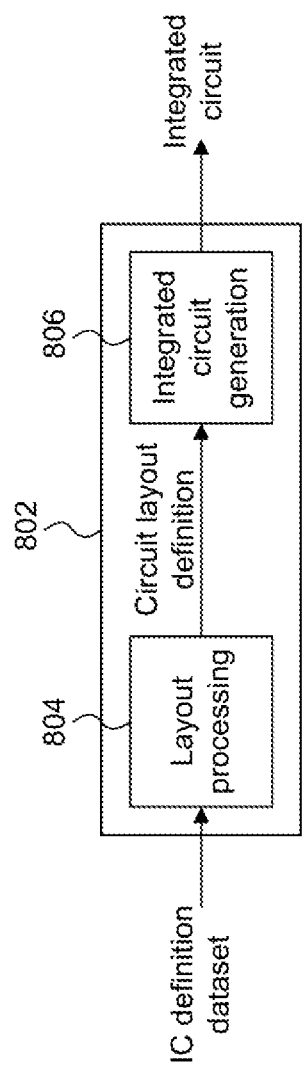
FIG. 8 is a schematic diagram of an integrated circuit manufacturing system.

FIG. 8 shows an example of an integrated circuit (IC) manufacturing system 802 which comprises a layout processing system 804 and an integrated circuit generation system 806. The IC manufacturing system 802 is configured to receive an IC definition dataset (e.g. defining a graphics unit as described in any of the examples herein, or a computing apparatus comprising a graphics unit as described in any of the examples herein), process the IC definition dataset, and generate an IC according to the IC definition dataset (e.g. which embodies a graphics unit or a computing apparatus comprising a graphics unit as described in any of the examples herein). The processing of the IC definition dataset configures the IC manufacturing system 802 to manufacture an integrated circuit embodying a graphics unit as described in any of the examples herein, or a computing apparatus comprising a graphics unit as described in any of the examples herein.

The layout processing system 804 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 804 has determined the circuit layout it may output a circuit layout definition to the IC generation system 806. A circuit layout definition may be, for example, a circuit layout description.

The IC generation system 806 generates an IC according to the circuit layout definition, as is known in the art. For example, the IC generation system 806 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 806 may be in the form of computer-readable code which the IC generation system 806 can use to form a suitable mask for use in generating an IC.

The different processes performed by the IC manufacturing system 802 may be implemented all in one location, e.g. by one party. Alternatively, the IC manufacturing system 802 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics unit, or computing apparatus comprising the graphics unit, without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 8 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 8, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The graphics units described herein, and the computing apparatuses comprising graphics units as described herein, may be embodied in hardware on an integrated circuit. The graphics units described herein, and computing apparatuses comprising graphics units as described herein, may be configured to perform any of the methods described herein.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. A method of profiling the performance of a graphics unit when rendering a scene according to a graphics pipeline comprising a geometry processing stage and a fragment processing stage, the method comprising:
   executing stages of the graphics pipeline using one or more units of rendering circuitry to perform at least one rendering task that defines a portion of the work required to render the scene, the at least one rendering task associated with a set flag;
   propagating an indication of the flag through stages of the graphics pipeline as the scene is rendered including from the geometry processing stage to the fragment processing stage so that work done as part of the at least one rendering task is associated with the set flag;
   counting occurrences of an event that occur whilst a unit of the one or more units of rendering circuitry performs an item of work associated with the set flag, and changing the value of a counter associated with unit of rendering circuitry in response to an occurrence of event whilst that unit performs an item of work associated with the set flag; and
   reading the value of the counter to thereby measure the number of occurrences of the event caused by completing the at least one rendering task.

2. The method as claimed in claim 1, wherein the at least one rendering task comprises a draw call to draw a portion of a scene.

3. The method as claimed in claim 1, wherein the at least one rendering task comprises a draw call to draw one or more objects of the scene.

4. The method as claimed in claim 1, wherein the method comprises enabling the counter in response to the associated unit performing an item of work associated with the flag, and disabling the counter when the associated unit performs an item of work not associated with the flag.

5. The method as claimed in claim 1, wherein the flag is propagated through each stage of the graphics pipeline.

6. The method as claimed in claim 1, further comprising associating, at a tagging unit, the set flag with the at least one rendering task.

7. The method as claimed in claim 1, wherein the graphics pipeline is a tile-based rendering pipeline.

8. The method as claimed in claim 7, further comprising associating, at a tagging unit, the set flag with the at least one rendering task, wherein the set flag is associated with the at least one rendering task prior to the tiling stage of the pipeline so that at least a portion of the work to complete the at least one rendering task occurs prior to the tiling stage of the pipeline.

9. The method as claimed in claim 1, wherein the method comprises storing an indication of the flag as part of intermediate parameter data generated from the geometry processing stage performed as part of the at least one rendering task to be used by the fragment processing stage.

10. The method as claimed in claim 1, wherein the method comprises: performing the geometry processing stage to generate primitive data from geometry data of the scene; and associating an indication of the flag with all of the primitive data generated as part of the at least one rendering task.

11. The method as claimed in claim 10, further comprising propagating the flag from the geometry processing stage to the fragment processing stage by associating an indication of the flag with fragments generated from primitive data associated with an indication of the flag.

12. The method as claimed in claim 1, wherein the flag is set by a driver that submits geometry data for the scene to be processed by the graphics pipeline.

13. The method as claimed in claim 1, wherein the method further comprises changing the value of a plurality of counters associated with a plurality of units of the rendering circuitry in response to occurrences of events whilst those units perform items of work associated with the set flag.

14. The method as claimed in claim 13, wherein the plurality of counters count respective events associated with different stages of the graphics pipeline.

15. The method as claimed in claim 13, wherein the method further comprises reading the values of each of the counters to measure the number of occurrences of the events caused by completing the at least one rendering task.

16. The method as claimed in claim 13, wherein each counter is associated with a different stage of the graphics pipeline.

17. The method as claimed in claim 1, wherein at least one of the units of rendering circuitry is associated with a plurality of counters, each of the plurality of counters counting an event associated with a different stage of the graphics pipeline.

18. The method as claimed in claim 1, wherein the event is one of: a clock cycle, a generation of a primitive; the culling of a primitive; the generation of a vertex; the processing of a vertex; and invocation of: a vertex shader; hull shader; domain shader; geometry shader; clipper; pixel shader or compute shader; the depth testing of a pixel as part of hidden surface removal; the decoding of an instruction or a texture request.

19. A graphics unit configured to render a scene according to a graphics pipeline comprising a geometry processing stage and a fragment processing stage, the graphics unit comprising:
   at least one unit of rendering circuitry configured to execute stages of the graphics pipeline to perform at least one rendering task that defines a portion of the work to render the scene, the at least one rendering task associated with a set flag; the graphics unit being configured to propagate an indication of the flag through stages of the graphics pipeline as the scene is rendered including from the geometry processing stage to the fragment processing stage so that work done as part of the at least one rendering task is associated with the set flag;
   a counter configured to count occurrences of an event that occur whilst one of the one or more units of rendering circuitry performs an item of work associated with the set flag, the counter being associated with saki unit of rendering circuitry and being configured to change its value in response to an occurrence of saki event whilst that unit performs an item of work associated with the set flag; and
   a counter reader configured to read the value of the counter to thereby measure the number of occurrences of the event caused by completing the at least one rendering task; and output a value indicative of the measured occurrences of the event.

20. A non-transitory computer readable storage medium having stored thereon a computer readable description of an integrated circuit that, when processed in an integrated circuit manufacturing system, causes the integrated circuit manufacturing system to manufacture a graphics unit configured to render a scene according to a graphics pipeline comprising a geometry processing stage and a fragment processing stage, the graphics unit comprising:
- at least one unit of rendering circuitry configured to execute stages of the graphics pipeline to perform at least one rendering task that defines a portion of the work to render the scene, the at least one rendering task associated with a set flag; the graphics unit being configured to propagate an indication of the flag through stages of the graphics pipeline as the scene is rendered including from the geometry processing stage to the fragment processing stage so that work done as part of the at least one rendering task is associated with the set flag;
- a counter configured to count occurrences of an event that occur whilst one of the one or more units of rendering circuitry performs an item of work associated with the set flag, the counter being associated with unit of rendering circuitry and being configured to change its value in response to an occurrence of event whilst that unit performs an item of work associated with the set flag; and
- a counter reader configured to read the value of the counter to thereby measure the number of occurrences of the event caused by completing the at least one rendering task; and output a value indicative of the measured occurrences of the event.

* * * * *